United States Patent [19]
Larson

[11] 3,874,110
[45] Apr. 1, 1975

[54] DOWNRIGGER LINE RELEASE

[76] Inventor: Raymond D. Larson, 105 Sixth St., Waunakee, Wis. 53597

[22] Filed: Apr. 3, 1974

[21] Appl. No.: 457,450

[52] U.S. Cl. ............................................. 43/43.12
[51] Int. Cl. ........................................... A01k 91/04
[58] Field of Search .............. 43/43.12, 43.1, 44.85, 43/44.86, 44.87, 44.92, 44.9; 24/201 B, 201 TR, 135 R

[56] References Cited
UNITED STATES PATENTS

| | | | |
|---|---|---|---|
| 249,689 | 11/1881 | Strong, et al. | 24/135 R |
| 3,277,681 | 10/1966 | Bey | 70/457 |
| 3,738,047 | 6/1973 | Tozer | 43/43.12 |

Primary Examiner—Louis G. Mancene
Assistant Examiner—Peter K Skiff
Attorney, Agent, or Firm—Theodore J. Long; John M. Winter; Harry C. Engstrom

[57] ABSTRACT

A downrigger line release device for a trolling system to suspend a fishing lure at a desired depth in the water. A magnet body is fixedly or slidably attached to a downrigger cable supporting a weight beneath the water surface. A magnetic line release means is magnetically engaged with said magnet body and is secured to a fishing line a desired distance ahead of a lure to support the lure at the depth of the magnet body on the downrigger cable. The line release means is separable from the magnet body by the force of a fish striking the lure to permit the fisherman to play the hooked fish without interference of the downrigger cable and weight.

4 Claims, 5 Drawing Figures

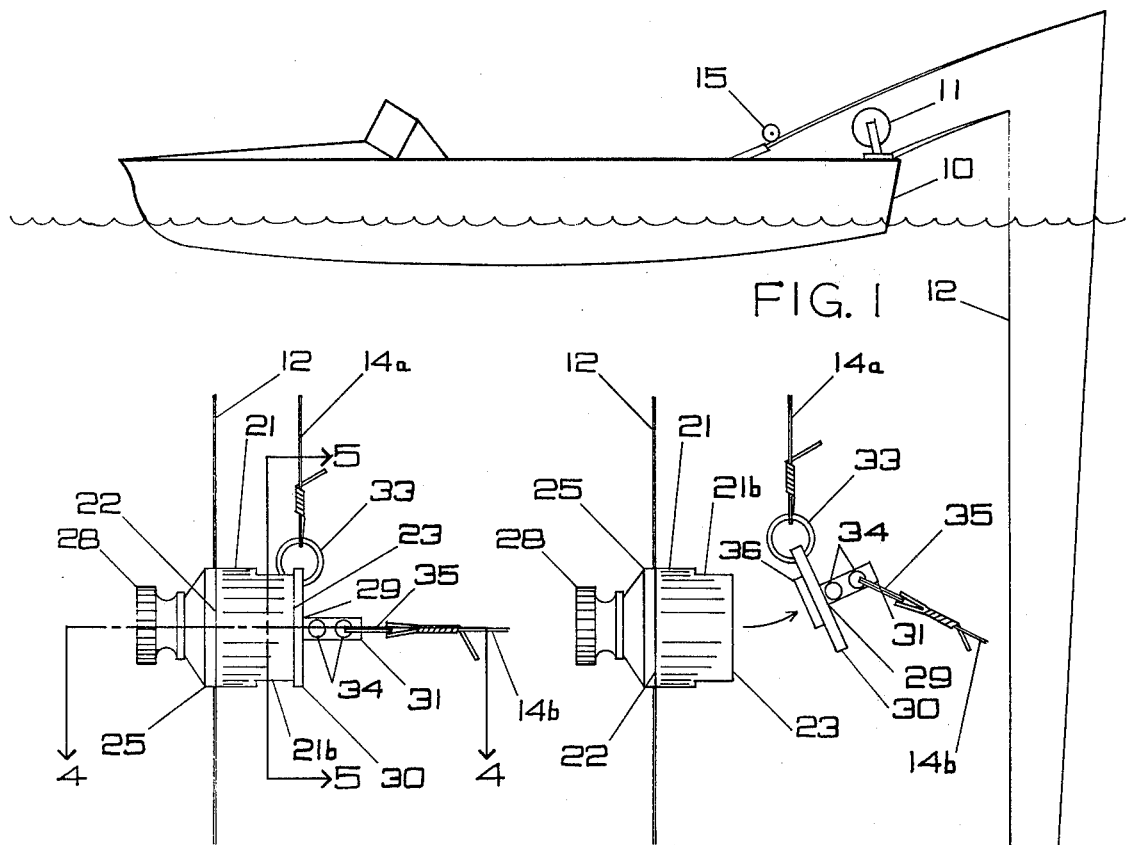
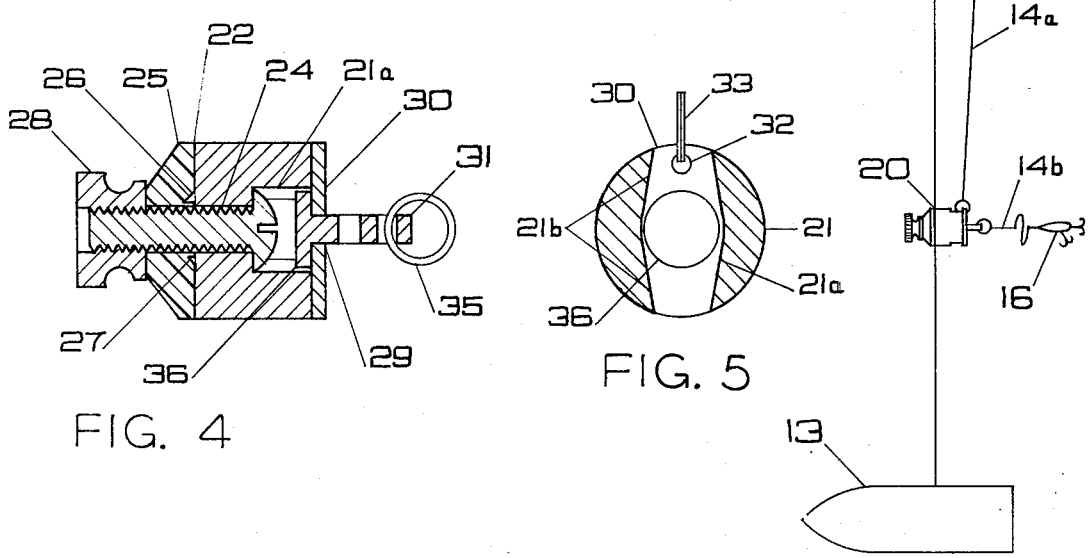

DOWNRIGGER LINE RELEASE

BACKGROUND OF THE INVENTION

1. Field of the Invention

This invention relates to trolling systems, and more specifically to downrigger line release devices for releasing a fishing line from a weight supporting downrigger cable after a fish has been hooked.

2. Description of the Prior Art

When trolling for fish in deep water the lure and line have a tendency to rise in the water behind the boat. The faster the speed of the boat, the greater the tendency of the lure to rise. Since fish are often found near the bottom or at considerable depths in the water, it is often necessary to use a heavy weight to keep the fishing lure down at the desired depth and close to the boat. This weight is usually attached to a "downrigger" line or cable which is carried on a separate reel mounted on the boat. Some sort of device is also required for either slidably or fixedly attaching the fishing line to the weight-supporting line or cable to cause the fishing line and lure to be supported at the desired depth in the water. It is also highly desirable from a sport fishing standpoint that the device be designed to release the fishing line from the weight-supporting downrigger cable when a fish strikes the lure and becomes hooked so that the downrigger cable does not interfere with the fishing line as the fisherman plays and brings in the fish.

Numerous downrigger mechanisms have been developed for attaching and releasing the fishing line to and from the downrigger cable. Such mechanisms have employed various mechanical structures, most frequently including springs and friction-fit connectors, to provide the required line releasing action. Similar mechanical devices have also been used as line releases in outrigger trolling systems designed to carry the fishing line and lure laterally outward from a moving boat, and in sinker release systems where a sinker weight carried by the fishing line is designed to be releasable upon becoming snagged or when a fish is hooked. However, such mechanical devices are frequently unduly complex and difficult to set up, usually requiring two hands to accomplish setting, and their performance is subject to deterioration with use and wear.

In addition, such devices have generally permitted only very limited rod pressure on the fishing line when the release is set, since the section of fishing line to the rod and the section of fishing line to the lure are both attached to the release device at the same point. With conventional devices, if the release mechanism is properly sensitive and responsive to the fish striking the lure, any substantial rod pressure on the device will frequently also effect release of the line by the device.

SUMMARY OF THE INVENTION

I have invented a downrigger line release device which is simple and easy to use, is sensitive and responsive to the strike of a fish to release the fishing line from the downrigger system, and which permits substantial rod pressure on the set device to prevent slack line and utilize the rod pressure in setting the hook in the fish.

My downrigger line release device employs a magnet body which is attachable to the downrigger cable, and a magnetic line release means attached to a fishing line and magnetically engagable on the magnet body. When a fish strikes the lure, the force of the fish on the fishing line disengages the magnetic line release means from the magnet body and the fish can be played and reeled in by the fisherman without interference from the downrigger cable and weight.

The magnet body has attachment means by which it may be selectively engaged on the downrigger cable in fixed or sliding relation. The sliding arrangement may be used where the fisherman does not want to reel up the downrigger cable and weight when attaching the downrigger line release device, and the weight of the magnet body and the action of the attached lure are then employed to carry the device with the attached fishing line and lure down the cable to the depth of the downrigger weight.

The magnetic line release means is relatively light compared to the magnet body so that the weight of the release means on the fishing line will not be noticeable to the fisherman while playing and reeling in a hooked fish.

The magnetic line release means has a magnetic disc portion which is releasably engagable on the magnet body by magnetic force, and a stem portion extending from the disc portion. The disc portion is attached to the portion of the fishing line extending to the rod, and the stem portion is attached to the portion of the fishing line extending to the lure. Means are provided for maintaining the alignment of the disc portion on the magnet body to prevent the disc portion from being released from engagement with the magnet body due to the pull of the line extending to the rod.

The disc portion is released from engagement by the body magnet when a fish strikes the lure attached to the stem portion and exerts a significant axial pull or moment on the stem portion.

Further objects, features and advantages of my invention will be apparent from the following detailed description taken in conjunction with the accompanying drawings showing a preferred embodiment of a downrigger line release device exemplifying the principles of my invention.

BRIEF DESCRIPTION OF THE DRAWINGS

In the drawings:

FIG. 1 is a schematic side view of a trolling system incorporating the downrigger line release device of my invention, with the lower broken away portion of the view being of larger scale than the upper portion for purposes of more clearly illustrating the manner of use of my device.

FIG. 2 is a side view of my downrigger line release device in its set condition whereby the fishing line is held in close proximity to the downrigger cable.

FIG. 3 is a side view of my downrigger line release device immediately after release of the magnetic line release means and attached fishing line from the magnet body and downrigger cable.

FIG. 4 is an enlarged section view taken along section line 4—4 of FIG. 2.

FIG. 5 is an enlarged section line taken along section line 5—5 of FIG. 2.

DESCRIPTION OF THE PREFERRED EMBODIMENT

Referring now more particularly to the drawings, wherein like numerals refer to like parts throughout the several views, a preferred embodiment of my downrigger line release device is shown generally at 20 in FIG.

1. The release device 20 is shown attached to a downrigger line or cable 12 extending from a downrigger support and reel 11 mounted on a boat 10. A downrigger weight 13 is attached to the end of the downrigger cable 12 and may be lowered to the desired depth below the boat or raised out of the water by means of the downrigger support and reel 11.

As illustrated, my downrigger line release device 20 may be attached to the downrigger cable 12 a desired distance above the weight 13, and the weight 13 and downrigger cable 12 are then lowered until the release device 20 is at the desired fishing depth. In addition, the release device 20 is attached to the fishing line 14a extending from the fishing rod and reel 15 mounted on the boat 10, and is also attached to the section of fishing line 14b extending from the device 20 to a lure 16. Accordingly, FIG. 1 generally illustrates a trolling system which employs a fishing line and lure releasably secured to a downrigger cable at a desired depth in the water by my line release device 20.

As more clearly shown in FIG. 2, my downrigger line release device 20 has a magnet body 21 formed of ferromagnetic material, such as iron, which has a high degree of magnetism. The magnet body 21 is preferably generally cylindrical with a forward end 22 and a rearward end 23. As best shown in FIG. 4, a post member 24 extends axially forward from the forward end 22 of the magnet body 21 to receive an attachment plate 25 which is secured on the post member 24 by an attachment nut 28 threadedly engaged thereon. The post member 24, attachment plate 25, and attachment nut 28 together comprise an attachment means for attaching the body magnet to the downrigger cable. The post member 24 is preferably a non-magnetic screw, the head of which is seated in an axial recess 21a which extends into the body magnet 21 from its rearward end 23 as shown in FIG. 4. The attachment plate 25 has at least one and preferably two elongated grooves 26 and 27 in the surface of the attachment plate 25 which engages the forward end of the magnet body 22. One of the grooves 27 has a smaller cross section than the downrigger cable 12 with which the release device will be used, so that the device 20 can be secured to the downrigger cable 12 in a fixed position by engaging the cable in the groove 27 and tightening the attachment nut 28 on the post member 24 so that the cable 12 is rigidly secured between the attachment plate 25 and the forward end 22 of the magnet body 21. The other groove 26 is of greater cross-sectional area than the thickness of the downrigger cable 12 so that the release device 20 may be slideably engaged on the cable 12 by locating the cable within the groove 26 and tightening the attachment plate 25 against the forward end 22 of the magnet body 21 by means of the attachment nut 28.

A magnetic line release means 29 in the form of a substantially flat disc portion 30 having a rearwardly extending stem portion 31 magnetically engages the rearward end 23 of the magnet body 21. The magnet body rearward end 23 is substantially flat to provide maximum surface contact with the flat disc portion 30. The disc portion 30 has a relatively small mass as compared to that of the magnet body, and is formed of magnetic material so that it will be maintained in engagement with the magnet body until a substantial axial or moment force is applied to the stem portion 31, as described more fully below, to disengage the disc 30 from the magnet body 21. A line attachment hole 32 is located near the circumferential edge of the disc portion 30 to receive a line attachment ring 33 for engaging the section of the fishing line 14a extending from the fishing rod and reel 15. The stem portion 31 preferably has a plurality of line attachment holes 34 located at different distances from the disc portion 30. A line attachment ring 35 is engaged in one of the stem portion line attachment holes 34 for attachment to the section of the fishing line 14b extending to the lure 16.

The axial recess 21a in the magnet body 21 extends vertically upward and downward from the center of the magnet body to define a slot 21b to accommodate the line attachment ring 33 extending through the line attachment hole 32 in the disc portion 30 when the disc portion engages the rearward end 23 of the magnet body, as shown in FIGS. 2 and 5. Since the vertical slot 21b extends to both the upper and lower edges of the magnet body, the magnet body can be positioned on the downrigger cable 12 with the slot 21b disposed vertically, and without regard for which end of the slot opens upwardly. The magnetic line release means 29 will then be engaged on the magnet body 21 with the line attachment ring 33 located partially within the upper end of the vertical slot 21b.

As best shown in FIGS. 1 and 2, when the magnetic line release means 29 is magnetically engaged on the rearward end 23 of the magnet body 21, the fishing line 14a from the fishing rod and reel 15 will exert an upward force on the disc portion 30 whenever the line 14a is taut. In fact, it is desirable for the fisherman to maintain a relatively taut line from the rod to the releasing device to prevent slack line and to utilize rod pressure in setting the hook in the fish as soon as the magnetic line release means 29 is disengaged from the magnet body 21 by the fish. Accordingly, means are provided to prevent the release means 29 from being disengaged from the magnet body 21 due to normal rod tension transferred through fishing line 14a to the attachment ring 33 and disc portion 30. The stem portion 29 in the preferred embodiment extends through the disc portion 30 to a head portion 36. The head portion 36 has a smaller outside diameter than the diameter of the recess 21a at the center of the magnet body 21, and is positioned within the recess 21a when the disc portion 30 is magnetically engaged against the body magnet 21, as best shown in FIGS. 4 and 5. The width of the recess 21a decreases as it extends upwardly and downwardly from the center of the magnet body so that the width of the slot 21b above and below the center of the magnet body is less than the diameter of the head portion 36. Accordingly, any lateral force which is exerted on the disc portion 30 by the attachment ring 33 and the fishing line 14a extending to the rod and reel 15 will be resisted by the engagement of the outer circumference of head portion 36 against the inner surfaces of the slot 21b of the magnet body 21 to prevent the disc portion 30 from sliding transversely off the magnet body 21 and releasing the fishing line. Therefore, with my improved downrigger line release device, substantial rod pressure can be maintained on the device without fear of disengaging the magnetic line release means 29 from the magnet body 21.

In use, my downrigger line release device can be fixedly mounted at the desired position on a downrigger release cable 12 in the manner described. The fishing line 14a from the rod and reel may then be secured to the line attachment ring 33 of the magnetic line release means 29 and line section 14b attached to the desired lure 16 is secured to line attachment ring 35. The device is then set by engaging the disc portion 30 against the rearward end 23 of the magnet body 21 where it will be maintained by magnetic force. Such engagement is very simple, as it merely requires the fisherman to bring the disc portion into close proximity and alignment with the magnet body 21 until it is attracted to and engaged upon the body portion 21 by magnetic force. This can be easily accomplished by one hand, and leaves the fisherman's other hand free to steady himself in the boat or handle other related tasks. The boat may then be operated to troll the lure at the fishing depth determined by the depth of the downrigger line release device.

As previously described, the fisherman may maintain rod pressure on the fishing line extending to the release device while waiting for the fish to strike. When the fish strikes the lure, it will exert a force on the lure 16 and line section 14b to cause the line release means 29 to be disengaged from the magnet body 21. Such force will be exerted by the line 14b through the attachment ring 35 and stem portion 31 either axially, or more commonly at an angle to the center axis of the release device 20. An axial force will pull the disc portion 30 directly off the magnet body 21 in a substantially axial direction. However, as the head portion 36 clears the recess 21a in the rearward end 23 of the magnet body 21, the release means 29 will be pulled upwardly as well as rearwardly due to the tension of the fishing rod and fishing line 14a, as illustrated in FIG. 3, and such upward movement will provide a positive force for setting the hook in the fish. In most cases the fish will strike the lure at an upward, downward or sideward angle to the axis of the release device. Such a strike will produce an angular force on the stem portion 31 of the release means 29 which will create a moment arm about a point on the edge of the disc 30 in engagement with the magnet body 21 to force the disc portion 30 off the magnet body. It can be readily seen that the farther the point of application of the force to the stem portion is from the disc portion, the greater will be the moment arm through which the force is transmitted, and the less force which will be required to disengage the release means 29 from the body magnet 21. Accordingly, by selecting a line attachment hole 34 on the stem portion closer to the disc portion 30 the amount of force required to disengage the release means will be increased. Conversely, by using a line engagement hole 34 farther from the disc portion 30 the amount of force required to disengage the release means 29 will be lessened. Obviously, the releasing force will be primarily dependent upon the degree of magnetic force exerted by the magnet body 21 on the release means 29, and the magnet body should be selected to provide the degree of magnetic force appropriate to the size and striking power of the type of fish for which it will be used.

As previously indicated, the fisherman may engage my downrigger line release device on the downrigger cable 12 without raising the cable and weight by utilizing the larger elongated groove 26 in the attachment plate 25 to produce a slip fit between the release device 20 and the cable 12. The weight of the magnet body and the action of the lure will then be utilized to carry the release device and lure down the cable. However, if a slip fit engagement is used, the fisherman will not be able to employ rod tension, since any substantial upward force exerted through line section 14a will cause the device to slide upwardly on the downrigger cable 12.

My release device 20 may also be used with a trolling board (not shown) of the type conventionally used to troll a line along a parallel path to one side or the other of a moving boat. The trolling board is connected to a line attached to the boat and the shape of the board causes the board to move transversely outward until it is located at some distance to one side of the boat, in much the same manner that the downrigger weight is located a desired distance below the boat. The downrigger line release device may then be fixedly attached to the trolling board, preferably by means of a pair of attachment rods extending upwardly from the trolling board and engaged within the elongated grooves 26 and 27 of the attachment plate 25. The line release device then operates in the same manner as previously described such that the magnetic line release means 29 will be disengaged from the magnet body 21 affixed to the trolling board when a fish strikes the lure. The fish can then be played and reeled in by the fisherman without interference from the trolling board.

It is understood that my invention is not confined to the particular construction and arrangement of parts herein illustrated and described, but embraces all such equivalent and modified forms thereof as come within the scope of the following claims.

I claim:

1. A downrigger line release device for a trolling system comprising:
   a. a magnet body having a flat surface and a recess in said flat surface,
   b. attachment means for attaching the magnet body to a cable supporting a weight, and
   c. a magnetic line release means including a disc portion for magnetically engaging the magnet body flat surface and having means for engaging a fishing line extending from a fishing rod, a head portion extending from the disc portion for engagement within the recess in the magnet body flat surface to prevent the disc portion from being transversely disengaged from the magnet body by a transverse force applied to the disc portion line engaging means, and a stem portion extending from the disc portion and having means for engaging a fishing line extending to a fishing lure, said magnetic line release means being separable from the magnet body flat surface when a force is applied to the stem portion line engagement means.

2. The downrigger line release device specified in claim 1 wherein the magnetic line release means stem portion has a plurality of line engagement means for engaging a fishing line extending to a fishing lure, each said line engagement means being located a different distance from the disc portion.

3. The downrigger line release device specified in claim 1 wherein the attachment means for attaching the magnet body to the weight supporting line includes a post member extending from the magnet body, an attachment plate mounted on the post member, and means for engaging the weight supporting line between the magnet body and the attachment plate.

4. The downrigger line release device specified in claim 1 wherein the attachment plate has a plurality of elongated grooves of different cross-sectional area and wherein at least one said groove will fixedly engage a weight supporting cable against the magnet body and at least one said groove will slidably engage a weight supporting cable against said magnet body.

* * * * *